US010859872B2

(12) United States Patent
Chen et al.

(10) Patent No.: US 10,859,872 B2
(45) Date of Patent: Dec. 8, 2020

(54) METHOD TO UTILIZE FORCE SENSORS TO ADJUST THE LCD PATTERN OR BRIGHTNESS ON A DISPLAY

(71) Applicant: DELL PRODUCTS L.P., Round Rock, TX (US)

(72) Inventors: Ching-Feng Chen, New Taipei (TW); Meng-Feng Hung, Taoyuan (TW); Yu-Lung Lin, Chungli (TW); Yi-Fan Wang, Taipei (TW); Wei-Sung Lin, Banqiao Dist. (TW)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 16/103,227

(22) Filed: Aug. 14, 2018

(65) Prior Publication Data
US 2020/0057342 A1   Feb. 20, 2020

(51) Int. Cl.
*G02F 1/13357* (2006.01)
*G09G 3/36* (2006.01)

(52) U.S. Cl.
CPC .. *G02F 1/133611* (2013.01); *G02F 1/133606* (2013.01); *G02F 1/133608* (2013.01); *G09G 3/36* (2013.01); *G09G 2320/0626* (2013.01)

(58) Field of Classification Search
CPC ......... G02F 1/133606; G02F 1/133608; G02F 1/133611; G02F 1/13338; G09G 3/36; G09G 2320/0626; G09G 2320/0686; G09G 3/342
See application file for complete search history.

(56) References Cited

U.S. PATENT DOCUMENTS

| 8,872,753 | B2 | 10/2014 | Glen | |
|---|---|---|---|---|
| 2009/0102399 | A1* | 4/2009 | Kita | H05B 45/50 315/307 |
| 2010/0123686 | A1* | 5/2010 | Klinghult | G06F 3/0412 345/178 |
| 2014/0028575 | A1* | 1/2014 | Parivar | G06F 3/0414 345/173 |
| 2014/0125618 | A1* | 5/2014 | Panther | A61B 5/6838 345/173 |
| 2016/0125815 | A1* | 5/2016 | Bar Shimon | G09G 5/10 345/690 |

FOREIGN PATENT DOCUMENTS

| EP | 0801376 B1 | 7/2010 |
|---|---|---|
| JP | 3891499 B2 | 3/2007 |
| JP | 4170899 B2 | 10/2008 |

(Continued)

*Primary Examiner* — Abhishek Sarma
(74) *Attorney, Agent, or Firm* — Jackson Walker LLP; Christopher J. Rourk

(57) ABSTRACT

A system comprising a display, a display cover, a plurality of sensors disposed between the display and the display cover and a lighting control system coupled to the display and the plurality of sensors, the lighting control system configured to receive one or more signals from the plurality of sensors and to reduce a backlight level of a subgroup of lighting elements associated with the one or more sensors associated with the one or more signals, wherein the subgroup of lighting elements is one of a plurality of subgroups of lighting elements of the display.

20 Claims, 2 Drawing Sheets

(56) References Cited

FOREIGN PATENT DOCUMENTS

| | | | |
|---|---|---|---|
| JP | 4918028 | B2 | 4/2012 |
| JP | 5082028 | B2 | 11/2012 |
| JP | 6006941 | B2 | 10/2016 |
| KR | 100415510 | B1 | 1/2004 |
| KR | 100849964 | B1 | 8/2008 |
| KR | 101260033 | B1 | 5/2013 |

* cited by examiner

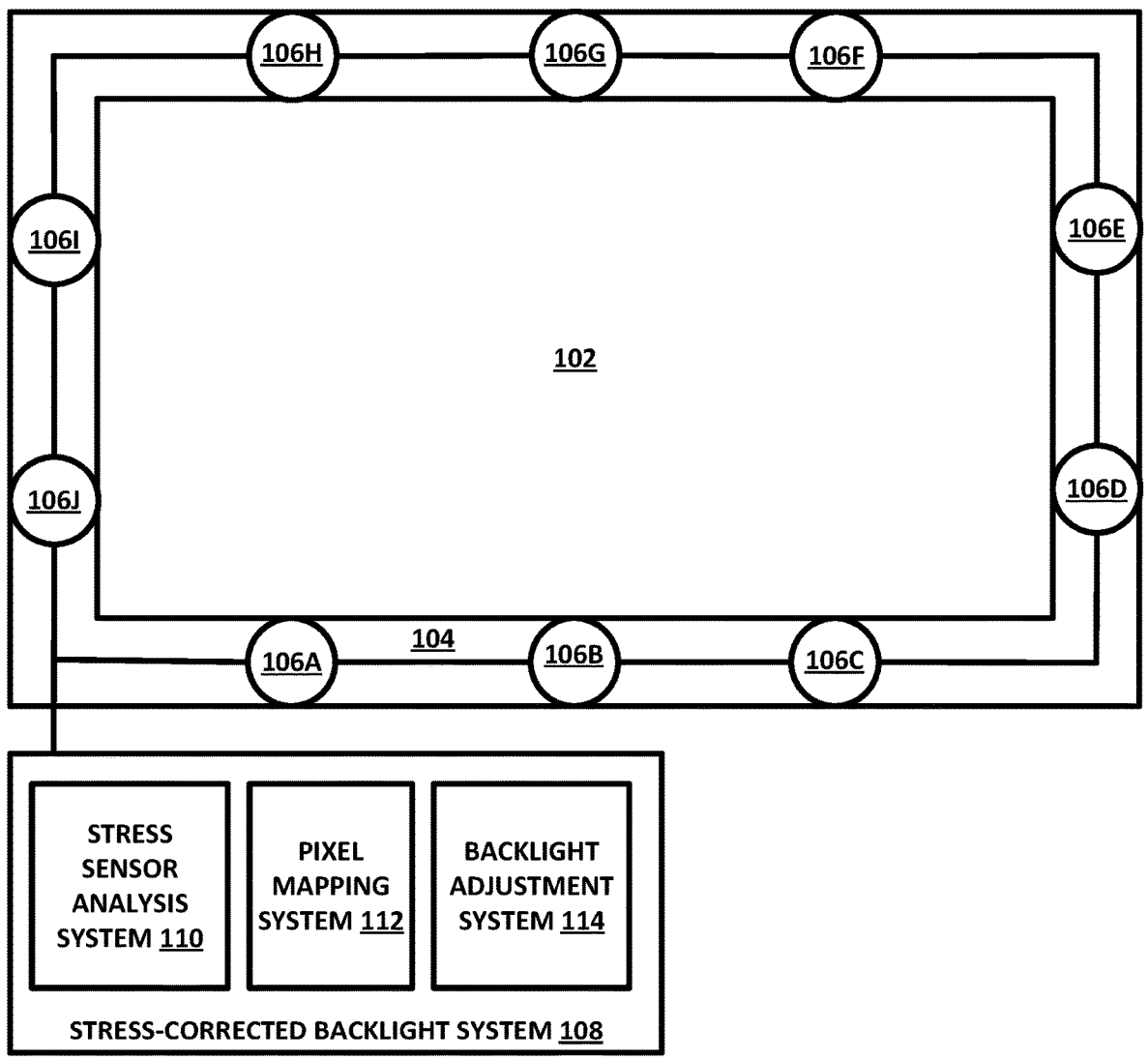

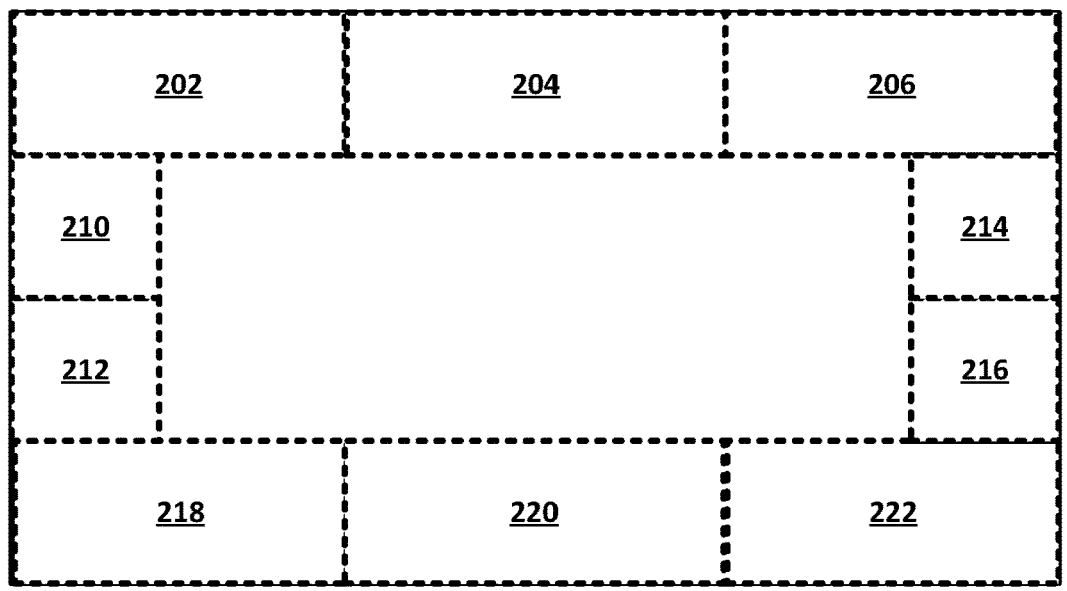
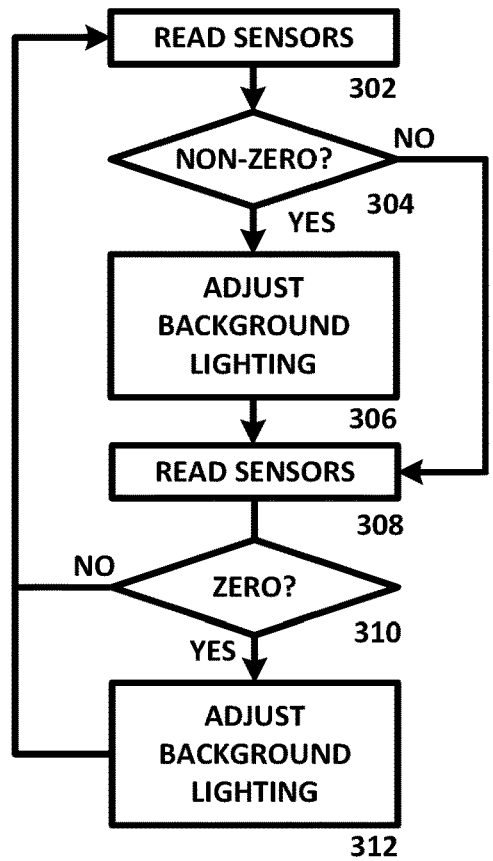
FIGURE 2
FIGURE 3

METHOD TO UTILIZE FORCE SENSORS TO ADJUST THE LCD PATTERN OR BRIGHTNESS ON A DISPLAY

TECHNICAL FIELD

The present disclosure relates generally to display devices, and more specifically to a method to utilize force sensors to adjust the LCD pattern or brightness on a display.

BACKGROUND OF THE INVENTION

Display devices have to operate in conjunction with mechanical structures, but these mechanical structures can cause the display devices to function improperly.

SUMMARY OF THE INVENTION

A system comprising a display, a display cover, a plurality of sensors disposed between the display and the display cover and a lighting control system coupled to the display and the plurality of sensors is disclosed. The lighting control system is configured to receive one or more signals from the plurality of sensors and to reduce a backlight level of a subgroup of lighting elements associated with the one or more sensors associated with the one or more signals, wherein the subgroup of lighting elements is one of a plurality of subgroups of lighting elements of the display.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings may be to scale, but emphasis is placed upon clearly illustrating the principles of the present disclosure. Moreover, in the drawings, like reference numerals designate corresponding parts throughout the several views, and in which:

FIG. 2 is a diagram of backlight control zones, in accordance with an example embodiment of the present disclosure; and FIG. 3 is a diagram of an algorithm for controlling backlight control zones, in accordance with an example embodiment of the present disclosure.

DETAILED DESCRIPTION OF THE INVENTION

Figure 1:
FIG. 1 is a diagram of a display having force sensors, in accordance with an example embodiment of the present disclosure.

In the description that follows, like parts are marked throughout the specification and drawings with the same reference numerals. The drawing figures may be to scale and certain components can be shown in generalized or schematic form and identified by commercial designations in the interest of clarity and conciseness.

A display device, such as a liquid crystal display (LCD) screen panel or other suitable display device, for a lap top computer or other suitable user devices can include a cover or other mechanical feature that is used to hold the LCD panel or other display device in the hinge-up position, to protect the LCD panel or other display device from getting damaged by external stress, to cover connectors or other electrical and mechanical parts inside the user device, and also for decorative or other non-functional purposes. However, such covers can create a number of mechanical problems.

For example, the gap between the cover and the LCD panel or other display device on a laptop or other user device can experience forces due to the application of an identifier on the cover, which can cause the cover to transfer more stress onto the LCD panel or other display device from the user or other case components. The LCD panels and other display devices are also getting thinner and more delicate, which can also cause the LCD panels or other display devices to cause light leakage or any undesired optical artifacts from the display device, such as when the cover conveys too much of such mechanical stresses onto the display device panel, which can happen for an in-plane switching panel in a dark-room environment or in other applications.

The present disclosure reduces or eliminates these problems by adding one or more force or strain gauges between the cover and the LCD panel or other display device, to provide feedback to adjust the displayed pattern or brightness based upon the stress distribution of the cover. These force sensors, such as force gauges or strain gauges, can be placed between the cover and the LCD panel or other display device, to obtain the stress distribution that the cover applies around edges of the LCD panel/display device. A control device, such as a controller board or other suitable component, receives and processes the signals from force sensors. The stress distribution data is output to a graphics controller that is configured to adjust a displayed pattern or brightness at any areas around edges of the LCD panel/display device where the cover applies stress.

The present disclosure provides a number of important technical features. One important technical feature is the prevention of customer complaints arising from light leakage on a laptop or other user device, such as for applications that are used under a low-light environment. These applications include computer gaming, displays on audiovisual display devices and other similar applications and devices.

FIG. 1 is a diagram of a display 100 having force sensors, in accordance with an example embodiment of the present disclosure. Display 100 includes LCD screen 102, cover 104, sensors 106A through 106J, stress-corrected backlight system 108, stress sensor analysis system 110, pixel mapping system 112 and backlight adjustment system 114, each of which can be implemented in hardware or a suitable combination of hardware and software.

LCD screen 102 is a liquid crystal display or other suitable displays, including but not limited to an in-plane switching panel, a light-emitting diode display, an indium gallium zinc oxide display, an active-matrix organic light-emitting diode or other suitable devices. In one example embodiment, LCD screen 102 can include a plurality of controllable backlight regions.

Cover 104 is disposed around the periphery of LCD screen 102, and can be a structural component that is used to contain LCD screen 102 and to secure it to a frame, as well as an ornamental component that includes ornamentation. Cover 104 can be fabricated from metal, polymer, composite or other suitable materials or combinations of materials. Although cover 104 is shown as rectangular with a uniform peripheral width, cover 104 can have a variable width, and can have other dimensional components (such as a thickness or irregular cross section), different shapes (such as square, round, oblong, irregular) and other suitable structural features.

Sensors 106A through 106J can be one or more force sensitive resistors, force sensors, strain sensors, strain gauges, pressure sensors or other suitable devices that can detect a load or force applied to LCD screen 102, cover 104 or other structural components such as a base, a support, a strut, a frame or so forth, where the load or force can cause a light-emitting device to generate undesired optical artifacts. In one example embodiment, LCD screen 102 can have a peripheral cover 104 that hides cabling, structural supports and other components, where cover 104 or other components can cause a load or force to be applied to LCD screen 102 in a manner that causes light to be emitted from the periphery of LCD screen 102, the intersection between LCD screen 102 and cover 104 or other locations. Sensors 106A through 106J can detect such forces or loads and can generate an associated signal that can be processed by stress-corrected backlight system 108 or other suitable systems, to generate backlight controls or other controls for one or more light-emitting elements of LCD screen 102. Although sensors 106A through 106J are shown disposed on top of cover 104, that is only for illustrative purposes, and sensors 106A through 106J can typically be disposed underneath cover 104, or in other suitable locations as a function of the structural design of cover 104 and associated structural components. In addition, while sensors 106A through 106J are shown connected in series, they can have separate connections to stress-corrected backlight system 108, such as to separate input pins, can be coupled to a common bus (such as a time multiplexed analog or digital signal bus) or can have other suitable connections Stress-corrected backlight system 108 receives stress, load or other sensor signals from sensors 106A through 106J and generates one or more lighting controls to compensate for a load, stress or other force applied to LCD screen 102, cover 104 or other structural components. In one example embodiment, stress-corrected backlight system 108 and each of its associated sub-systems can be a controller board provided with LCD screen 102, can be implemented as part of the driver for LCD screen 102 or can be implemented in other suitable manners, and can include a processor and firmware, one or more application-specific integrated circuits or other suitable devices, as discussed further herein.

Stress sensor analysis system 110 is configured to receive electrical signals from sensors 106A through 106J and generates associated stress data, load data, force data or other suitable data. In one example embodiment, stress sensor analysis system 110 can be configured to read a voltage generated by each of sensors 106A through 106J, such as at a different pin, at a different time slot or in other suitable manners, and can process the voltage using one or more conversion algorithms to generate data representative of a stress, load, force or other physical parameter. The data can be stored in one or more registers or otherwise processed for subsequent use.

Pixel mapping system 112 is configured to receive pixel address data and converts stress or strain sensor locations to associated pixel addresses. In one example embodiment, pixel mapping system 112 can be used to associate each of sensors 106A through 106J with one or more light producing elements, such as to control a backlight level or for other suitable purposes.

Backlight adjustment system 114 is configured to receive control signals from stress sensor analysis system 110, pixel mapping system 112 and other suitable control signals and to adjust a lighting for one or more light emitting elements. In one example embodiment, a stress, strain, force or other signal measured by one or more of sensors 106A through 106J can be converted into a backlight reduction percentage, where a pulse width modulation (PWM) backlight brightness is reduced in a linear or non-linear manner as a function of the signal measured by one or more of sensors 106A through 106J. In one example embodiment, a maximum force or other signal value can be empirically determined, where the maximum force requires a complete reduction in backlight level, and the corresponding reduction in backlight level for lower levels of force can be empirically determined, linearly or non-linearly extrapolated, or otherwise determined.

In operation, system 100 provides a system and method to utilize force sensors or other suitable sensors to adjust an LCD pattern or brightness on a display, so as to prevent leakage from areas adjacent to covers or other structural components. System 100 provides the technical feature of preventing inadvertent or undesired optical artifacts generation due to force or strain.

FIG. 2 is a diagram of backlight control zones 200, in accordance with an example embodiment of the present disclosure. Backlight control zones 200 include sections 202 through 222, each of which are associated with a subset of light emitting elements of a display. In one example embodiment, the addresses or other control information for the light emitting elements in each of sections 202 through 222 can be identified by a variable or in other suitable manners, to allow the light emitting elements to be controlled to reduce inadvertent light emission, as discussed herein.

FIG. 3 is a diagram of an algorithm 300 for controlling backlight control zones, in accordance with an example embodiment of the present disclosure. Algorithm 300 can be implemented in hardware or a suitable combination of hardware and software.

Algorithm 300 begins at 302, where one or more load, stress, strain, force or other suitable sensors are read. In one example embodiment, the sensors can be read by detecting a voltage at a predetermined input pin of a controller board, by monitoring a plurality of time slots or other suitable signals on a bus or in other suitable manners. The voltage can be converted into an associated sensor reading value, can be stored in a data file or register, or other suitable steps can also or alternatively be performed. The algorithm then proceeds to 304.

At 304, it is determined whether a non-zero reading has been obtained. In one example embodiment, when the sensors are not reading a signal, then an associated voltage or other suitable signal will not be generated, such that a non-zero reading correlates to sensor activity. In another example embodiment, the margin of error for a sensor reading can require that any reading that is less than a predetermined amount be treated as if it were a zero reading, or other suitable processes can also or alternatively be used. If a non-zero reading has been obtained, the algorithm proceeds to 306, otherwise the algorithm proceeds to 308.

At 306, background lighting is adjusted. In one example embodiment the background lighting can be adjusted by modifying a pulse width modulation signal to incrementally reduce a backlight signal, or other suitable processes can also or alternatively be used. The algorithm then proceeds to 308.

At 308, one or more load, stress, strain, force or other suitable sensors are read. In one example embodiment, the sensors can be read by detecting a voltage at a predetermined input pin of a controller board, by monitoring a plurality of time slots or other suitable signals on a bus or in other suitable manners. The voltage can be converted into an associated sensor reading value, can be stored in a data file or register, or other suitable steps can also or alternatively be performed. The algorithm then proceeds to 310.

At 310, it is determined whether a zero reading has been obtained. In one example embodiment, when the sensors are not reading a signal, then an associated voltage or other suitable signal will not be generated, such that a non-zero reading correlates to sensor activity. In another example embodiment, the margin of error for a sensor reading can require that any reading that is less than a predetermined amount be treated as if it were a zero reading, or other suitable processes can also or alternatively be used. If it is determined that a zero reading has been not been obtained, the algorithm returns to 302, otherwise the algorithm proceeds to 312.

At 312, background lighting is adjusted. In one example embodiment the background lighting can be adjusted by modifying a pulse width modulation signal to increase a backlight signal, or other suitable processes can also or alternatively be used. The algorithm then returns to 302.

Although algorithm 300 is shown as a flow chart, one or more flow charts, one or more objects or agents, one or more state machines, one or more threads or other suitable programming paradigms can also or alternatively be used to implement algorithm 300.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A system comprising:
   a display;
   a display cover;
   two or more stress sensors disposed between the display and the display cover along each side of the display cover at predetermined locations to minimize a display pattern created by stress applied by the display cover; and
   a lighting control system coupled to the display and the two or more stress sensors, the lighting control system configured to receive one or more signals from each of the two or more stress sensors and to reduce the display pattern created by the stress of a subgroup of lighting elements associated with the two or more stress sensors, wherein the subgroup of lighting elements is one of a plurality of subgroups of lighting elements of the display.

2. The system of claim 1 wherein the two or more stress sensors comprise one or more of a force sensor or a strain gauge.

3. The system of claim 1 wherein each of the two or more stress sensors are coupled to the lighting control system by a separate conductor.

4. The system of claim 1 wherein each of the two or more stress sensors are coupled to the lighting control system by a bus.

5. The system of claim 1 wherein the lighting control system further comprises a sensor analysis system configured to receive the signal from each of the stress sensors and to convert the signal to an associated force value.

6. The system of claim 1 wherein the lighting control system further comprises a pixel mapping system configured to associate one or more light emitting elements with a stress sensor location.

7. The system of claim 1 wherein the lighting control system further comprises a backlight adjustment system configured to receive a control signal associated with the one or more signals from the two or more stress sensors and to modify a backlight level associated with the subgroup of lighting elements by reducing a pulse width modulation of a power source to the subgroup of lighting elements using a nonlinear relationship in response to the one or more signals.

8. A method for preventing light leakage from a display, comprising:
   measuring a force at one of two or more stress sensors disposed along each side on a display applied by a display cover;
   determining a subgroup of light emitting elements of the display associated with the one of the two or more stress sensors; and
   reducing a display pattern created by stress of the subgroup of light emitting elements of the display.

9. The method of claim 8 further comprising:
   determining that the force at the one of the two or more stress sensors has been removed; and
   increasing the backlight brightness of the subgroup of light emitting elements of the display.

10. The method of claim 8 wherein measuring the force at the one of the two or more stress sensors disposed along each side on the display comprises measuring the force at two or more of the two or more stress sensors disposed along each side on the display.

11. The method of claim 8 wherein measuring the force at the one of the two or more stress sensors disposed along each side on the display comprises measuring the force at two or more of the two or more stress sensors disposed along each side on the display applied by the display cover.

12. The method of claim 8 wherein reducing the display pattern created by stress of the subgroup of light emitting elements of the display comprises reducing the backlight brightness of the subgroup of light emitting elements of the display by an amount proportional to the force.

13. A system comprising:
   a plurality of subgroups of two or more stress sensors disposed between a display and a display cover along each side of two or more sides of the display cover; and
   a lighting control system coupled to the display and the plurality of subgroups of two or more stress sensors, the lighting control system configured to receive one or more signals from one or more of the plurality of subgroups of two or more stress sensors when the display cover applies a force to one or more of the stress sensors of one of the subgroups and to reduce a display pattern created by stress of a subgroup of lighting elements associated with the one or more of the plurality of subgroups of two or more stress sensors associated with the one or more signals in response to the force.

14. The system of claim 13 wherein the two or more stress sensors comprise one or more of a force sensor or a strain gauge and are configured to be activated by the display cover.

15. The system of claim 13 wherein each of the two or more stress sensors are coupled to the lighting control system by a separate conductor.

16. The system of claim 13 wherein each of the two or more stress sensors are coupled to the lighting control system by a bus.

17. The system of claim 13 wherein the lighting control system further comprises a sensor analysis system configured to receive the signal from each of the stress sensors and to convert the signal to an associated force value.

18. The system of claim 13 wherein the lighting control system further comprises a pixel mapping system configured to associate one or more light emitting elements with a stress sensor location.

19. The system of claim 13 wherein the lighting control system further comprises a backlight adjustment system configured to receive a control signal associated with the one or more signals from the two or more stress sensors and to modify a display pattern created by stress associated with the subgroup of lighting elements by modifying a pulse width modulation of a power source for the subgroup of lighting elements.

20. The system of claim 13 wherein the lighting control system further comprises a sensor analysis system configured to receive the signal from each of the stress sensors and to convert the signal to an associated force value for each of the stress sensors.

* * * * *